June 9, 1931.  J. MELLOR  1,809,056
METALLIC PACKING
Filed Sept. 4, 1922   2 Sheets-Sheet 1
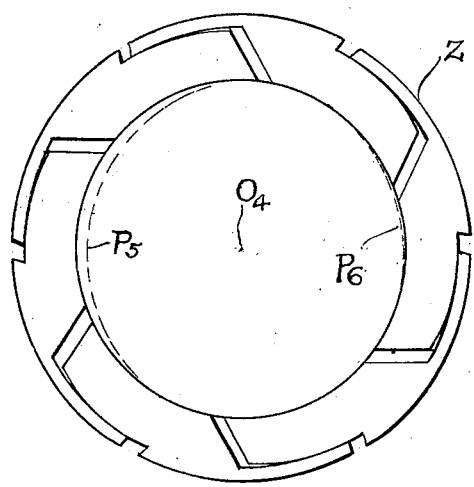
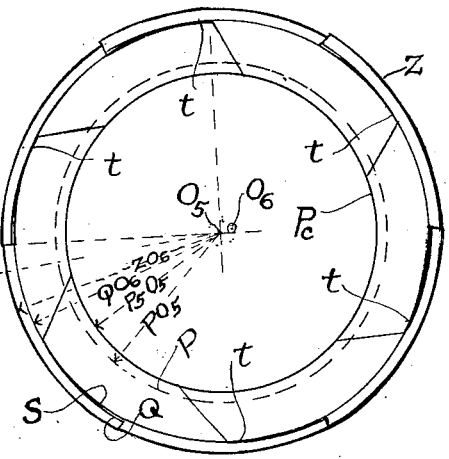
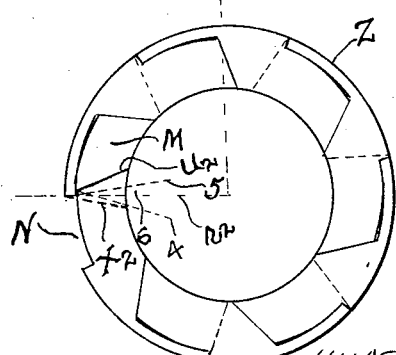
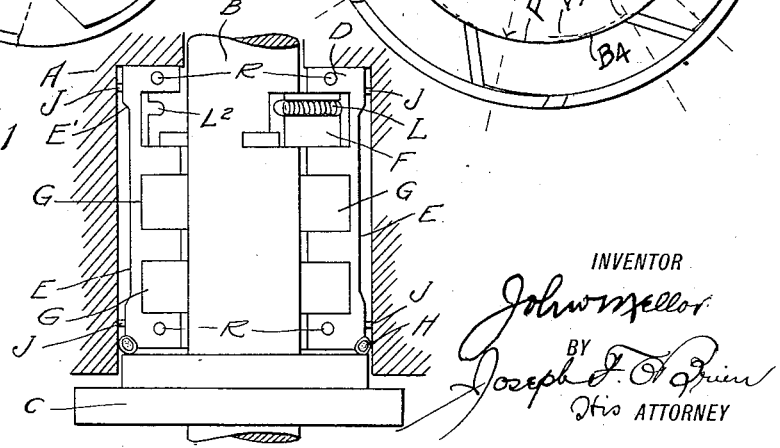
INVENTOR
John Mellor
BY Joseph F. O'Brien
His ATTORNEY June 9, 1931.    J. MELLOR    1,809,056
METALLIC PACKING
Filed Sept. 4, 1922    2 Sheets-Sheet 2
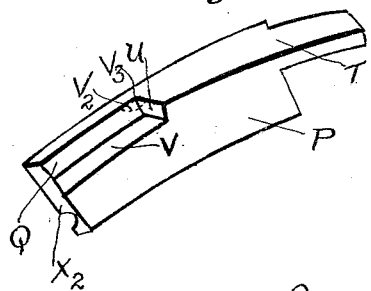
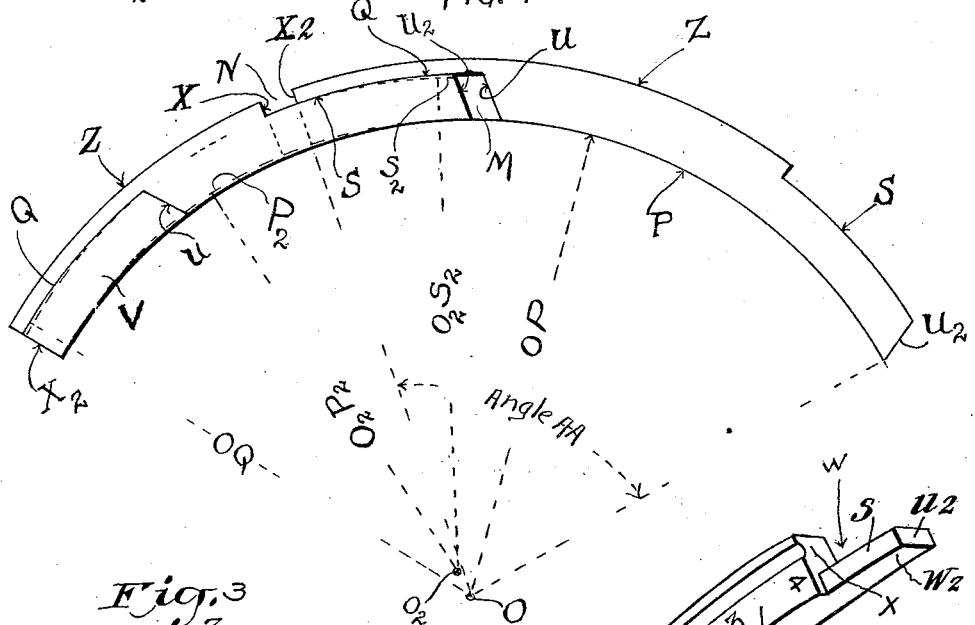
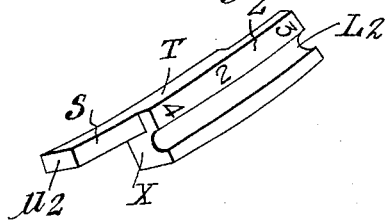
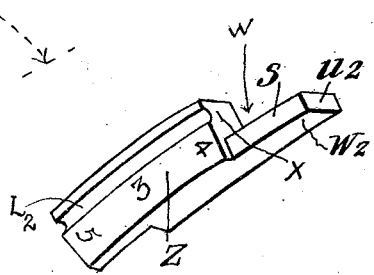
INVENTOR
John Mellor
BY
Joseph F. Quinn
His ATTORNEY Patented June 9, 1931

1,809,056

UNITED STATES PATENT OFFICE

JOHN MELLOR, OF BAY HEAD, NEW JERSEY

METALLIC PACKING

Application filed September 4, 1922. Serial No. 586,054.

My invention relates to metallic packing and is designed more particularly for reciprocating members of engines, compressors, pumps and the like.

Among the objects of this invention is to produce a packing which will afford a metallic flexible ring composed of a plurality of segments preferably so marked as to insure accurate assembly, said ring being provided with a compensating joint movement having abutting surfaces so arranged relatively as to produce in any position within the limits of expansion or contraction, wear or vibration, a tight joint without binding, unusual friction or upsetting of correct registration of the several parts with reciprocating member.

For a better understanding of my invention and its merits and also for a more accurate description of the detail construction and method of application of my invention, reference is to be had to the description and accompanying drawings.

Similar reference numbers or letters indicate identical parts in the description and several figures on the drawings.

Figure 1 is a longitudinal section of a stuffing box of usual construction showing a reciprocating member in place partially surrounded by a metallic packing embodying my invention.

Figure 2 is a perspective view from inside the ring of a segment of the packing ring showing the surfaces of countersunk end.

Figure 3 is a perspective view from outside the ring of a segment of a packing ring showing the surfaces of a projecting end.

Figure 4 is a side elevation showing the relation of one segment of my ring to another adjacent segment and illustrating in dotted lines the positions of surfaces.

Figure 5 is a view of a segment of a ring showing the surfaces of projecting end.

Figure 6 is a diagrammatic view of a segmental ring showing the relative position of the differentially curved periphery of the projection with the segments in extended position and showing in dotted lines the differences, with a fixed variation in diameter of the rod with relation to the bore of the ring, between a segment of more than a quadrant extent of the circumference and a segment of quadrant extent of the circumference.

Figure 7 is a similar view showing the same segmental ring in contracted position and particularly illustrating the position of the line of tangency between the differentially curved periphery of the projection and annular surface of the countersink.

Figure 8 is a similar view of a segmental ring of smaller size in which the contractable space is between two segments.

Figure 9 is a view similar to Fig. 6 illustrating in dotted lines the condition which occurs when the rod is smaller than the bore of the ring in extended position and with segments of greater and less than quadrant extent.

Referring to Fig. 1, A is a stuffing box, B is a reciprocating member and C is a gland of a mechanism such as an engine, compressor, pump or the like, as usually constructed. D is a section of a casing which for illustration purposes only is shown to have three grooves, more or less being applicable. Said casing is made preferably in two parts, drilled and tapped and supplied with screws in apertures R to fasten the parts together. The diameter of casing D is reduced intermediate its ends to form a circumferential countersink E in the periphery extending to points adjacent to the opposite ends of casing D and providing at opposite sides of said countersink end-portions E1, increased in diameter.

Each of my expanding and contracting rings F is composed of segments, overlapping in mating ends and having an intercommunicating groove L2 in its exterior annular surface for the reception of a coiled spring L and designed to expand and contract without disrupting the interlocking device or seal formed between the segment ends. It will be understood that said rings F may have free movement within suitable grooves G in a packing casing when utilized in connection with such a casing, to compensate for any unevenness or vibration of the member on which they are applied. H is a sealing ring composed of a hollow tubing filled with a fibrous material. It is made hollow to aid collapsibility and filled as stated to promote uniformity in process of squeezing into place. By placing the segmental rings in place around the member B, encasing the rings F within casing D, associating the rings F and the casing D with the box A, seating the sealing ring H in its groove and setting the gland C in place a tight joint between the member B and the box A may be produced and an effective packing is provided. In order to effectually apply this packing, it is desirable to set the casing D in correct registration with the box A and the member B and to this end I insert the spacing pins J in the periphery of the casing D and these pins extend beyond the said periphery a distance sufficient to compensate for the difference between the diameter of the periphery of the casing D and the diameter of the annular surface of the box A.

The rings F are of expanding and contracting design having when fully extended a space N between the radial end surfaces X and X2, (Figs. 2, 3, 4 and 5) and a space M between the surfaces U and U2 of adjacent segments. In this extended position of the ring F the curvature of the surfaces P and Q are concentric at center O, having respectively radii OP and OQ (Fig. 4) and the segments comprising the ring are each preferably less than quadrant extent so that the angle AA at center O which is subtended by an arc of the limit of length of a single segment does not exceed 90°. By virtue of the shortening of arc of the segment within this angular limitation, I am enabled (1) more readily to compensate for the differences in curvature between the annular surface P and the peripheral surface of the member B due to imperfections in workmanship, expansion or contraction of different metals, uneven wear and other causes; (2) the flexibility of the ring is increased; (3) the amount of variation in extreme radii of surfaces is reduced; and (4) the joint movement between the segment ends is decreased by said limitation as compared with a segmental arc of greater subtending angle. With this angular limitation the area of overlap of the mating segment ends is necessarily shortened. The efficiency of the joint formed between the faces of the surface V (Figs. 2 and 4) to surface W (Fig. 5) is directly proportionate to the area of lapping contact. The area of such lapping contact is affected by the lengthening and consequent variations of the arc at surface P. If the segments are divided along radial lines the longest line that can be drawn in the surfaces V or Q is at the junction of surface V and Q and must be equal also in length to the line of intersection of surfaces S and W. But when the segments are so cut that the plane of surface U is parallel with the radii of the curve, the overlap will, due to shortening of the arc of shorter radius with constant angle, be shorter at the intersection of surfaces V and P and must be equal also to W and P. So in order to secure an area of overlapping contact as great as possible between the radial surfaces V and W, the angle V2 (Fig. 2) formed by a plane tangent to the annular surface Q at the point V3 and plane U is greater than a right angle. Likewise the angle W2 (Fig. 5) between the surfaces S and U2, similarly formed, is greater than a right angle. By thus increasing the angles V2 and W2 it is possible to overcome the loss of area in said contacting surfaces V and W due to decreasing the length of arc at the surface P caused by shortening of the radii approaching center O with constant angle.

In Fig. 4 is shown two adjacent segments of a ring. In extended position all the curved surfaces are concentric as to the center O except as hereinafter noted. The annular surface P of ring contacts with the peripheral surface of the reciprocating member B and in use produces wear on said surface P of the ring and the periphery of member B. The effect is to change all the radii of curvature centering at point O decreasing distance between point O and any part of the surfaces of curvature P, Q and S. By shifting the center O to center O2 equal to the amount of assumed wear, we are able to superimpose a curve which shows resultant curvature of plane P and produces plane P2. The radius of curved plane P having center O is a longer radius than O2P2 representing contracted worn ring. From center O2 and with a radius to nearest point of curved plane Q extended as shown by four dotted lines, Fig. 4, the curve with radius O2S2 is described at each end of segment. The process of operation and consequent contraction of the ring due to wear with the shortening of radius OP must induce differentially greater pressure with consequent greater wear toward the center of the segment on the surface P. All of the surface P is in contact with the periphery of B and must be so maintained during the wear of ring and the shortening of the radius developing curve P2. To allow for contraction of the ring corresponding to the shortening of the radius OP as described spaces M and N are provided between the mating end surfaces X and X2 also U and U2. There is provided a sliding contact between the peripheral surfaces S of projection of one segment and the annular surface Q of mating adjacent countersunk end of the adjoining segment. It is readily apparent, that, where expanding and contracting segmental rings, having in one position, concentric curved surfaces of different radii and where one of said surfaces, as P for instance, is subject to change of curvature, due to wear, and where other curved surface, such as S and Q formerly of identical radii, suffer change of distance from common center to any point, without corresponding change in surface curvature, the concentric relation is upset. The pressures acting upon the peripheral surface of the ring, mainly consisting of a fluent substance as a gas or liquid and the assembly spring, producing equal external pressures, the segments will wear substantially evenly and approach a center,—in a path of the radii of curvature maintaining substantially a true curve of such surfaces as P with respect to center O. While the assembled ring F, Fig. 1 is flexible, the component segments are individually rigid, and for the above reasons, in process of contraction, surfaces such as S and Q, increasingly toward the outer ends, approach the center at a proportionately slower rate causing surface Q to pivot at extremity of plane of curve S. Such effect produces an unbalancing contact between outer end of surface S and inner end of surface Q. To avoid this unbalancing contact of said surfaces, one of such contacting surfaces and, as shown, the surface S is formed of a differentially varying curvature by which I mean a curve having radii varying gradually within certain limits and, as shown, this curve of differential radii comprises a compound curve of varying radii, differentially decreasing between radius OQ and radius O2S2 which is equal to distance of inner end of curvature Q to center O2 when ring F is fully contracted as illustrated by dotted line curvature from center O2. By this variation of surface S a constant line of tangency is formed between surfaces Q and S in an expanding and contracting movement of ring F thus forming a tight joint. I further provide a radial surface of contact between plane surfaces V in the countersunk end of one segment and plane surface W in the projection end of an adjacent segment forming a liquid or vaporous tight joint between them. Radial surface T, similar on all segments of a ring forms a close joint with an inner radial surface of a groove G within the casing forming a close joint with the casing. Since these rings operate under liquid or gaseous pressure, said pressure acting equally in all directions against the periphery Z of ring, since ring segments are held uniformly in place by the spring L (Fig. 1) and since the adjustments by the compounding curve of the peripheral surface S provides a receding sliding surface of contact with surface Q and since there is a sliding contact between surfaces V and W; also a sliding contact between radial surfaces of G with T; also between the annular surface P and the periphery of B, the construction as composed of separate interlocking segments forms a ring, (1) compensating as to irregularities of travel of the member B, (2) flexible as to variations in the periphery of the member B, (3) capable of expansion or contraction for condition of wear, with the desirable effect of a tight joint.

In order to assemble packing rings always of the same segments and to maintain these segments in the same relation I prefer to employ a marking method comprising the placing of a central similar mark on each segment and an endwise matching mark on the mating ends of segments. Where a complete set of packing contains more than one ring, each ring has its own central mark similar as to the segments of that ring—with matching marks on segment ends. For example in Fig. 3, 2 is a central mark common to all segments of its ring while 4 and 3 are end marks similar to marks on the mating ends of adjoining segments.

Fig. 6, which is a diagrammatic view of a segmental ring, shows the relative position of the differentially-curved periphery of a projection with the segments in extended position, and the dotted lines P5 and P6 show the differences in positions in relation to a rod of given diameter with the center O4, which will be assumed by a segment of more than quadrant extent and a segment of less than a quadrant extent, respectively on the circumference Z, a radius is taken from the ends of the segments.

Fig. 7 is a similar view showing the same segmental ring in contracted position and particularly illustrating the position of line of tangency T between the differentially curved periphery S of the projection and the annular surface Q of the countersink. The extent of the contraction is illustrated as the difference between radius P5O5 and PO5 between the center O5 and the annular surfaces Pc and P respectively,—the curvature of Q and Z not being subject to change by wear or otherwise have their curves in the original radii of their curvature QO6 and ZO6 respectively.

Fig. 8 is a similar view of a segmental ring of smaller size in which the extent of the contractible spaces M, similar in extent to N, is between two segments. It is evident, were surfaces U2 and X2 formed by a division of segments along radial lines, the overlap of mating ends would be destroyed and were the said surfaces to follow lines 4 and 5 respectively a gap 6 would lie between said surfaces.

Fig. 9 is similar to Fig. 6 illustrating in broken lines B1 and B3, the condition which occurs when rod B is smaller than the bore radius PO7 of the ring, in extended position with segments respectively greater and less than quadrant extent. It is noted that an appreciable space B2 lies between the rod periphery B1 and the annular surface P in the first instance while in the second instance the space B4 is negligible comparatively, as bounded by lines P and B3. It is noted that the variation illustrated in this Fig. 9 is large since B4 would otherwise be indistinguishable. Contrarily, a slight variation in B produces a noticeable space B2.

Various minor modifications may be made in the above invention without departing from the invention as herein claimed.

Having thus described my invention, what I claim and desire to secure by Letters Patent is:

1. In a metallic packing, a segmental ring comprising a series of segments, each having a countersink at one end and a projection at the opposite end adapted to contact respectively with adjacent segments and the outer surface of each projection having a curvature varying differentially from the surface on the adjacent segment with which it contacts, and resilient means for yieldingly retaining said segments in contact with each other.

2. In a metallic packing, a segmental ring having overlapping mating segmental ends, each having a countersink at one end and a projection at the opposite end adapted to contact respectively with similar adjacent segments, means for increasing the area of the overlapping mating ends, and resilient means for yieldingly retaining said segments in contact with each other.

3. In a metallic packing, an expanding and contracting segmental ring comprising a series of overlapping contacting segments with mating ends, each segment having a curved surface varying differentially from a curved surface on the adjacent segment with which it contacts, each segment being of less quadrant extent between the shortest portion of the ends, and resilient means for yieldingly retaining said segments in contact with each other.

4. In a metallic packing, an expanding and contracting segmental ring composed of a series of overlapping contacting segments with mating ends, comprising projections and countersunk seats and each segment being of less than quadrant extent between the most remote portions of the ends, whereby very greatly increased flexibility is produced, and resilient means for yieldingly retaining said segments in contact with each other.

5. In a metallic packing, an expanding and contracting segmental ring comprising a series of overlapping contacting segments with mating ends comprising projections and countersinks each projection having a differential curve having radii decreasing from its connection with the body of segment toward the end thereof, and resilient means for yieldingly retaining said segments in contact with each other.

6. In a metallic packing, a segmental ring comprising a series of segments each having an inner arcuate rod contacting surface and overlapping mating segmental ends, each having a countersink at one end and a projection at the opposite end adapted to contact respectively with similar adjacent segments, one of the contacting surfaces of said ends having a curvature substantially concentric with the curvature of said inner rod-contacting surface and the opposite surface having a different curvature, whereby a rolling line of contact during wear is obtained while maintaining contact between the said inner rod-contacting surface and the rod, and means for yieldingly retaining said segments in contact with each other.

7. In a metallic packing, an expanding and contracting segmental ring composed of a series of overlapping contacting segments with mating ends, comprising projections and countersunk seats and each segment being of less than quadrant extent between the most remote portions of the ends, whereby very greatly increased flexibility is produced, one of the contacting surfaces of said ends having a curvature substantially concentric with the curvature of the inner rod contacting surface and the opposite surface having a different curvature, whereby a rolling line of contact during wear is obtained while maintaining contact between the said inner rod-contacting surface and the rod, and means for yieldingly retaining said segments in contact with each other.

In witness whereof, I have signed my name to the foregoing specification.

JOHN MELLOR.